US006484869B1

(12) United States Patent

Brouwer et al.

(10) Patent No.: US 6,484,869 B1

(45) Date of Patent: Nov. 26, 2002

(54) CONVEYOR PERSONNEL GATE

(75) Inventors: Gerald A. Brouwer, Grandville, MI (US); James L. Frank, Grand Haven, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 2 days.

(21) Appl. No.: 09/712,756

(22) Filed: Nov. 14, 2000

(51) Int. Cl.[7] ................................................ B65G 41/00

(52) U.S. Cl. ...................... 198/592; 198/930; 193/35 G

(58) Field of Search .................... 193/35 G; 198/861.5, 198/632, 950, 502, 53; 186/66, 68

(56) References Cited

U.S. PATENT DOCUMENTS

| | | | | | |
|---|---|---|---|---|---|
| 1,303,574 | A | * | 5/1919 | Murphy | 198/632 |
| 1,418,024 | A | * | 5/1922 | Rider | 198/632 |
| 2,803,327 | A | * | 8/1957 | Kerr, Jr. | 198/632 |
| 3,199,140 | A | * | 8/1965 | McKnight et al. | 198/632 |
| 3,787,039 | A | * | 1/1974 | Zeichman | 269/13 |
| 5,172,804 | A | * | 12/1992 | Chersin | 198/861.5 |
| 5,568,857 | A | * | 10/1996 | Chen et al. | 198/592 |

OTHER PUBLICATIONS

Drawings of a conveyor system which was publicly disclosed or on sale more than one year prior to the filing date of the present application.

* cited by examiner

*Primary Examiner*—Douglas Hess

(74) *Attorney, Agent, or Firm*—Van Dyke, Gardner, Linn & Burkhart, LLP

(57) ABSTRACT

A freestanding conveyor personnel gate includes a support or base portion and a conveyor portion, which is pivotable and movable relative to the support between a closed position and an open position. The gate includes a latch mechanism which is operable to latch the gate in both the open and close positions. The latch mechanism is operable via a handle which is movable in either direction to disengage the latch mechanism and to raise or lower the conveyor portion toward its open or closed position. The conveyor portion is balanced and supported via a strut member which is pivotally mounted at the conveyor portion and the support portion. A biasing member is provided to bias the conveyor portion toward its closed position when the conveyor portion is moved past a neutral point between the open and close position. The biasing member is further operable to bias the conveyor portion toward its opened position when the conveyor portion is moved past the neutral position toward the open position of the gate. The biasing member thus self propels the gate toward its opened or closed position, while the latch mechanism locks the gate in the respective position once that position is reached by the conveyor portion.

56 Claims, 9 Drawing Sheets

35
35a
35b
35c 37
37a
37b
37c 24
24a
24b
30
70
78
A 38
38a
42
43
46
50
52
54
56
70

CONVEYOR PERSONNEL GATE

FIELD OF THE INVENTION

The present invention relates generally to personnel gates for conveyors which open to allow a person to pass from one side of the conveyor to the other, and close to connect an upstream portion of the conveyor with a downstream portion of the conveyor via a conveying surface of the personnel gate.

BACKGROUND OF THE INVENTION

It is known to provide conveyor personnel gates between portions of a conveying path to allow people to get from one side of the conveying path to the other. The personnel gates typically are lowered to a closed position, whereby the conveying surface of the gate extends between an upstream and downstream portion of the conveying path to form a generally continuous conveying path. The gates may be raised to an opened position, such that a person may walk through the opening at the gate to cross from one side of the conveying path to the other.

Typically, such conveyor gates are pivotably mounted to an upstream end of the conveying path and are closed to engage a saddle or receiving bracket at the downstream end of the conveying path. This requires corresponding mounting components at both the upstream and downstream ends of the conveying path, such that the gates are not easily installed at various conveying paths. Accordingly, the gates may be applicable only to the specific conveyors for which they are designed, which may further lead to many designs of conveyor gates in order to provide gates for various conveyor designs.

Conventional conveyor gates are manually raised and lowered between their opened and closed positions. A concern with many of the prior art conveyor gates is that when released by an operator during the closing process, the gates may slam down to their closed position. Not only is this hard on the components of the gate and the conveyor, which may lead to greater maintenance and repair costs, this also raises safety concerns for a person or persons who may be walking past or under the gate as it slams down to its closed position. Additionally, many prior conveyor gates are not securable in their upward or open position, such that the conveyor gates may unexpectedly close without manual intervention.

Also, when raised to their upright, open position, the upper end of most conventional gates extends the entire length of the gate above the height of the conveyor at which it is mounted, because the gate is pivotable about a fixed horizontal axis at the conveyor. The gate thus may interfere with low overhead clearance conveyors or other items at a low height above the conveyor and gate.

SUMMARY OF THE INVENTION

The present invention is intended to provide a conveyor personnel gate which is movable between opened and closed positions and which may be latched in both the opened and closed positions. The gate is easily moved between its opened and closed positions in response to a biasing member which assists in raising and lowering the gate in a controlled manner.

According to a first aspect of the present invention, a conveyor personnel gate comprises a support, a conveyor portion and a latch. The conveyor portion is pivotally support by the support and pivotable about a generally horizontal axis at the support. The latch is operable to latch the conveyor portion relative to the support in both an opened position and a closed position. The latch may include a user handle which is operable to actuate the latch in response to movement of the user handle. The user handle may also allow a user to move the conveyor portion of the gate between the opened and closed positions via movement of the handle. Preferably, the conveyor portion is self-propelled in a controlled manner to the opened position when the conveyor portion is positioned between a particular position and the closed position. Additionally, the conveyor portion may be self-propelled to the open position when the conveyor portion is moved to a position between the particular position and the closed position.

According to another aspect of the present invention, a conveyor personnel gate comprises a support, a conveyor portion and a handle operated latch assembly. The conveyor portion is pivotally supported by the support and is pivotable about a generally horizontal axis. The handle operated latch assembly includes a grasp handle at the conveyor portion and a latch. The grasp handle is movable relative to the support to move the conveyor portion about the axis. The latch is operable to latch the conveyor portion in at least one position, and is unlatched in response to movement of the grasp handle.

According to another aspect of the present invention, a conveyor personnel gate comprises a support, a conveyor portion and a biasing member. The conveyor portion is pivotally supported by the support to pivot about a generally horizontal axis. The biasing member is operable to control movement of the conveyor portion about the axis between a generally horizontal closed position and an open position. The biasing member is interconnected between the support and the conveyor portion such that the biasing member biases the conveyor portion toward the closed position when the conveyor portion is positioned between a neutral position and a closed position. The biasing member further biases the conveyor portion toward the opened position when the conveyor portion is positioned between the neutral position and the opened position. In a preferred embodiment, the biasing member is interconnected between the support and the conveyor portion via an over center mount arrangement. Optionally, the gate may further include a damper which is operable to dampen, retard or otherwise control movement of the conveyor portion toward the closed position.

DETAILED DESCRIPTION OF THE PREFERRED EMBODIMENTS

Figure 1:
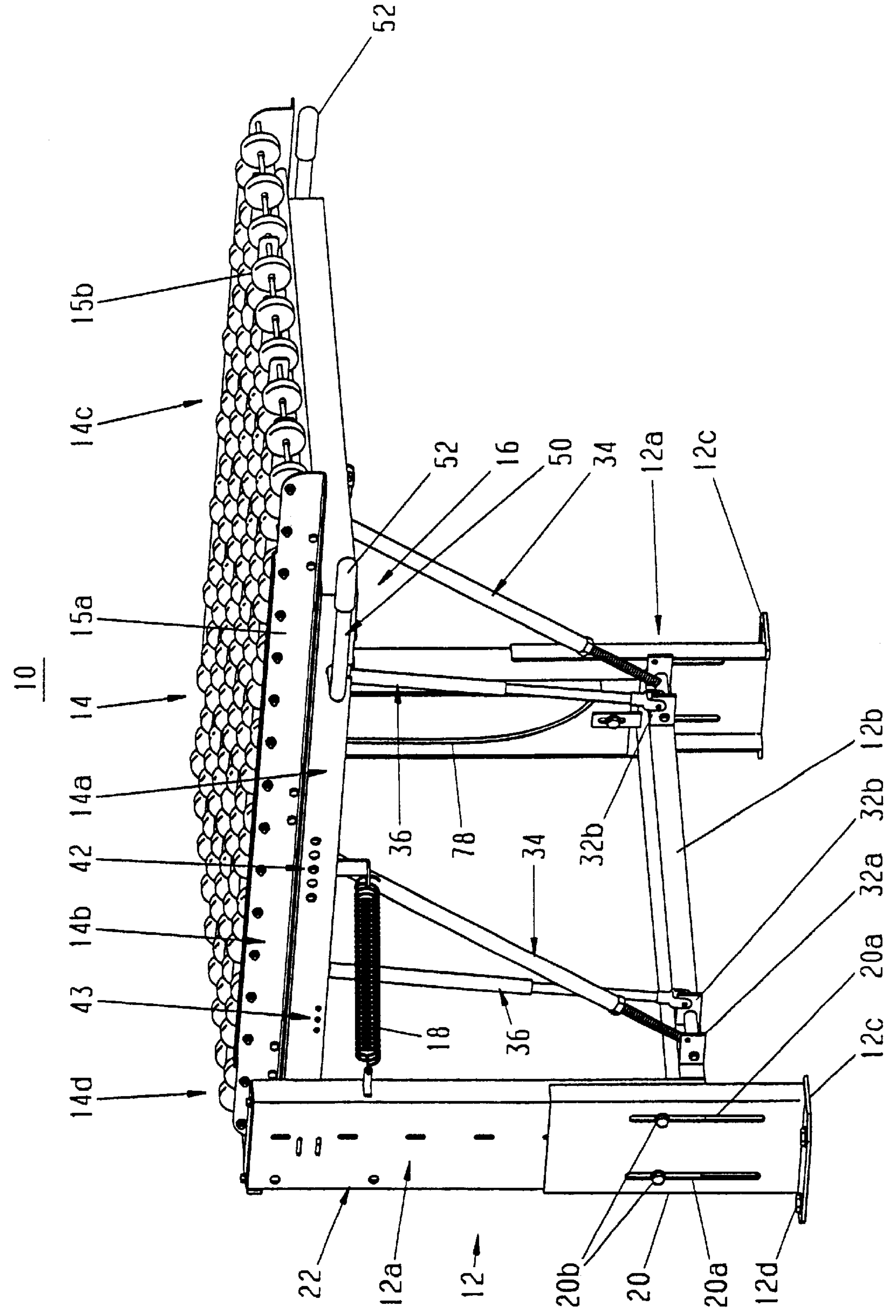
FIG. 1 is a perspective view of a conveyor personnel gate in accordance with the present invention, with the gate in its closed position.
Figure 2:
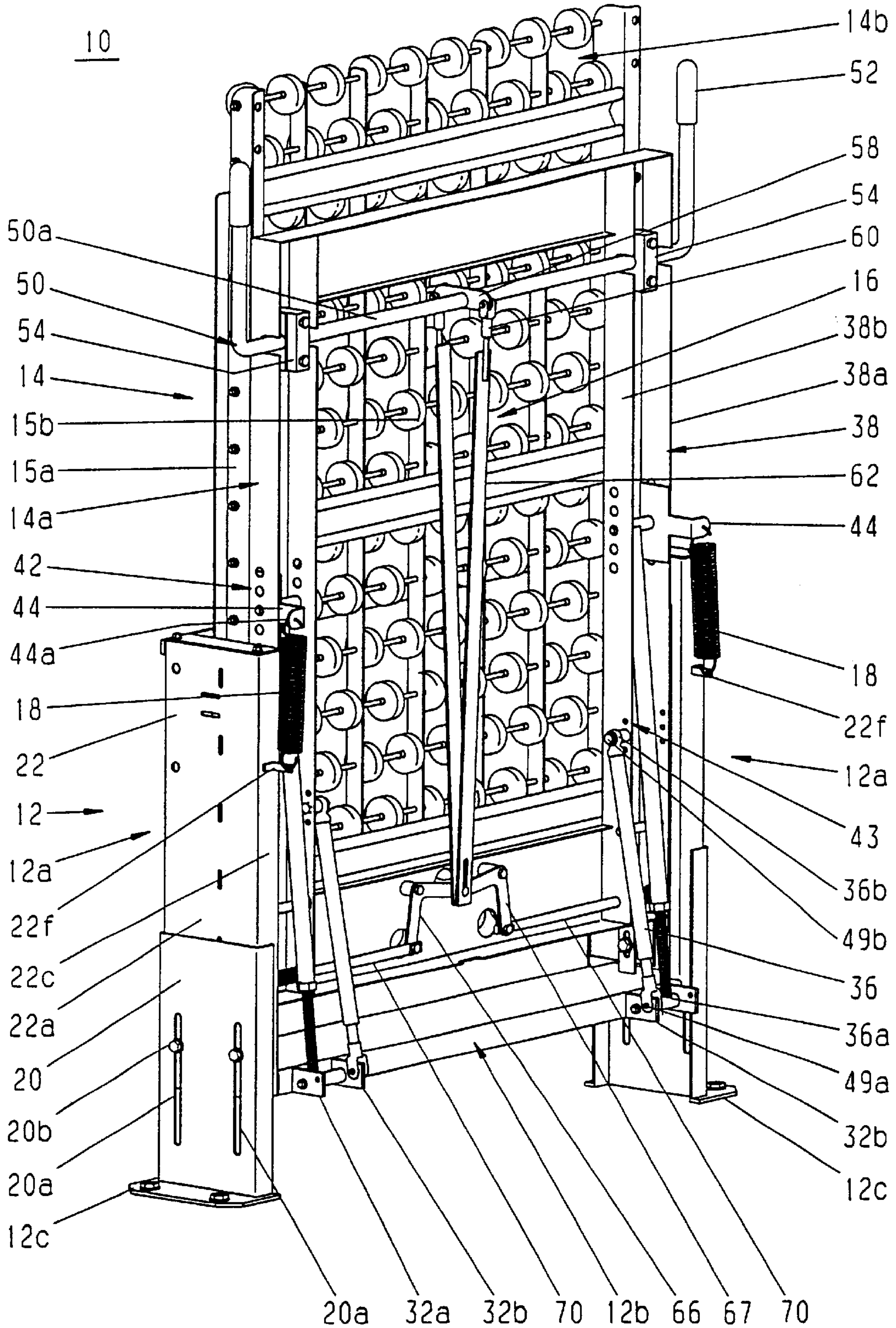
FIG. 2 is a perspective view of the conveyor personnel gate of FIG. 1, with the gate in its opened position.

Referring now specifically to the drawings and the illustrative embodiments depicted therein, a conveyor personnel gate 10 includes a support or base portion 12 and a conveyor portion 14 which is pivotally mounted to support 12 and pivotable about a generally horizontal axis between a closed position (FIG. 1) and an open position (FIG. 2). Conveyor personnel gate 10 includes a latch assembly 16, which is operable to latch the conveyor portion 14 in both the closed position and the open position. Also, a pair of biasing members or counter balance springs 18 are interconnected between support 12 and conveyor portion 14 to bias conveyor portion 14 toward its opened and closed positions, as discussed below. Conveyor personnel gate 10 is positionable at a gap along a conveyor system, such as between an upstream end of a conveyor and a downstream portion of the conveyor (not shown).

As shown in FIGS. 1, 2, 4 and 5, support base 12 includes a pair of columns 12*a* at opposite sides of support base 12 and a generally horizontal cross member 12*b* extending between columns 12*a*. Support base 12 is securable to the floor or other generally fixed structure via a mounting plate 12*c* at the lower end of each column 12*a* and suitable fasteners, such as bolts 12*d* or the like. Each mounting plate 12*c* is welded or otherwise secured at a lower end of a lower portion 20 of the respective column 12*a*. As shown in FIG. 1, conveyor personnel gate 10 is a free standing gate, with support 12 being securable to a floor or structure, and conveyor portion 14 being cantileverly supported at support 12 when in the closed position. Although support 12 is generally a free standing support secured at its lower end to the floor or support structure, one or both columns 12*a* may be further secured or braced with respect to the adjacent conveying portion of the conveyor (not shown) via suitable straps or braces (also not shown) bolted or otherwise secured between the conveyor and the column or columns, in order to further stabilize support 12 relative to the conveyor at which the gate is installed, without affecting the scope of the present invention.

Figure 3:
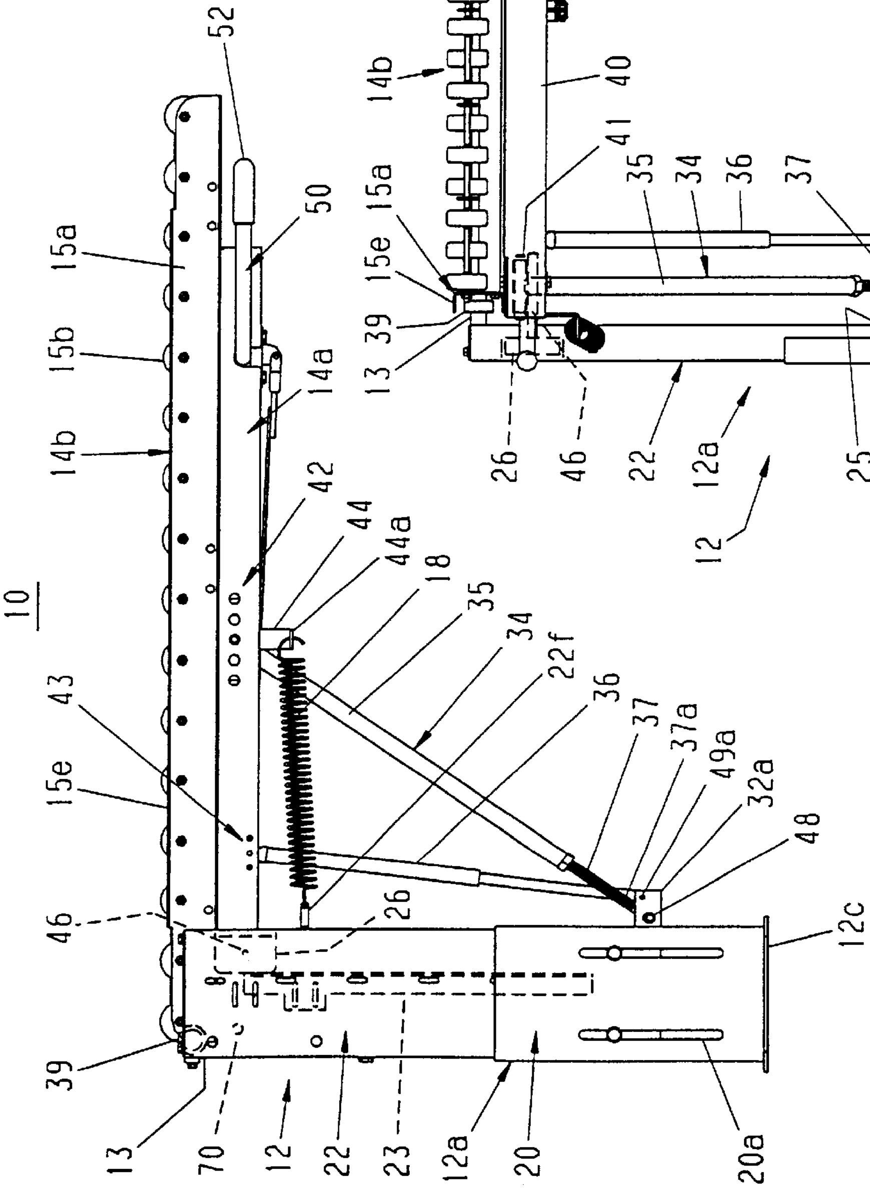
FIG. 3 is a side elevation of the conveyor personnel gate, with the gate in its closed position.
Figure 4:
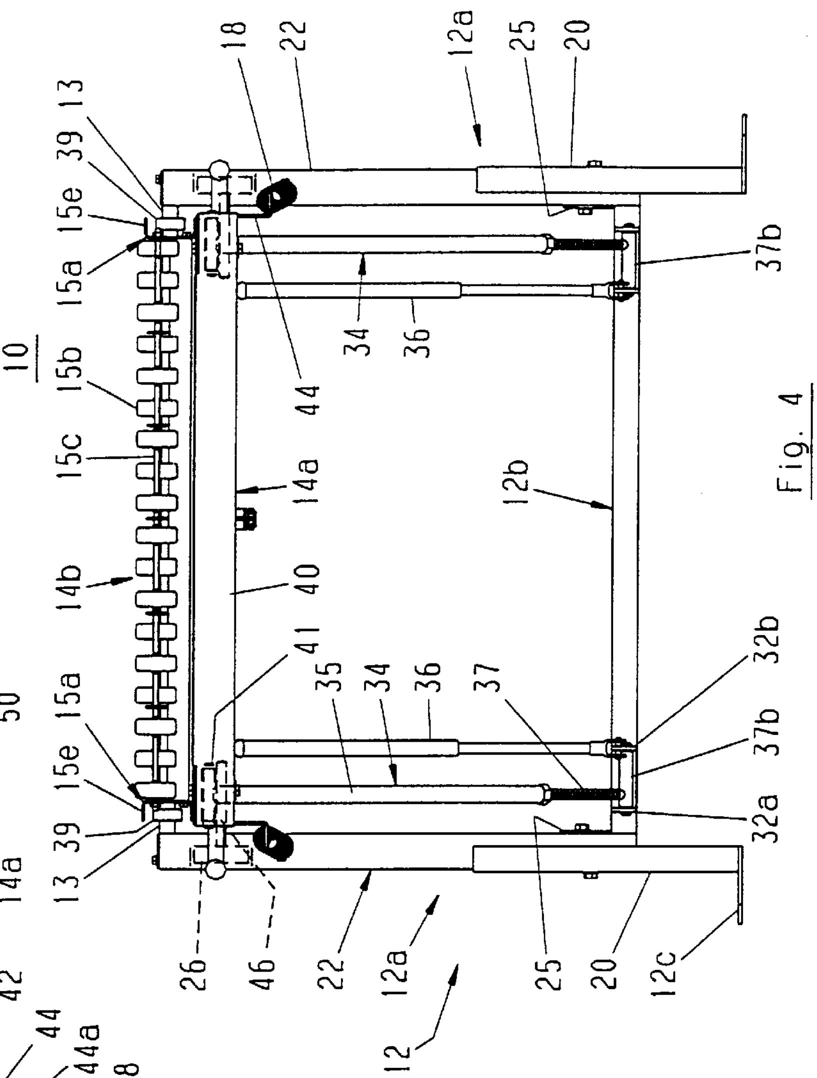
FIG. 4 is an end elevation of the conveyor personnel gate of FIG. 3.
Figure 5:
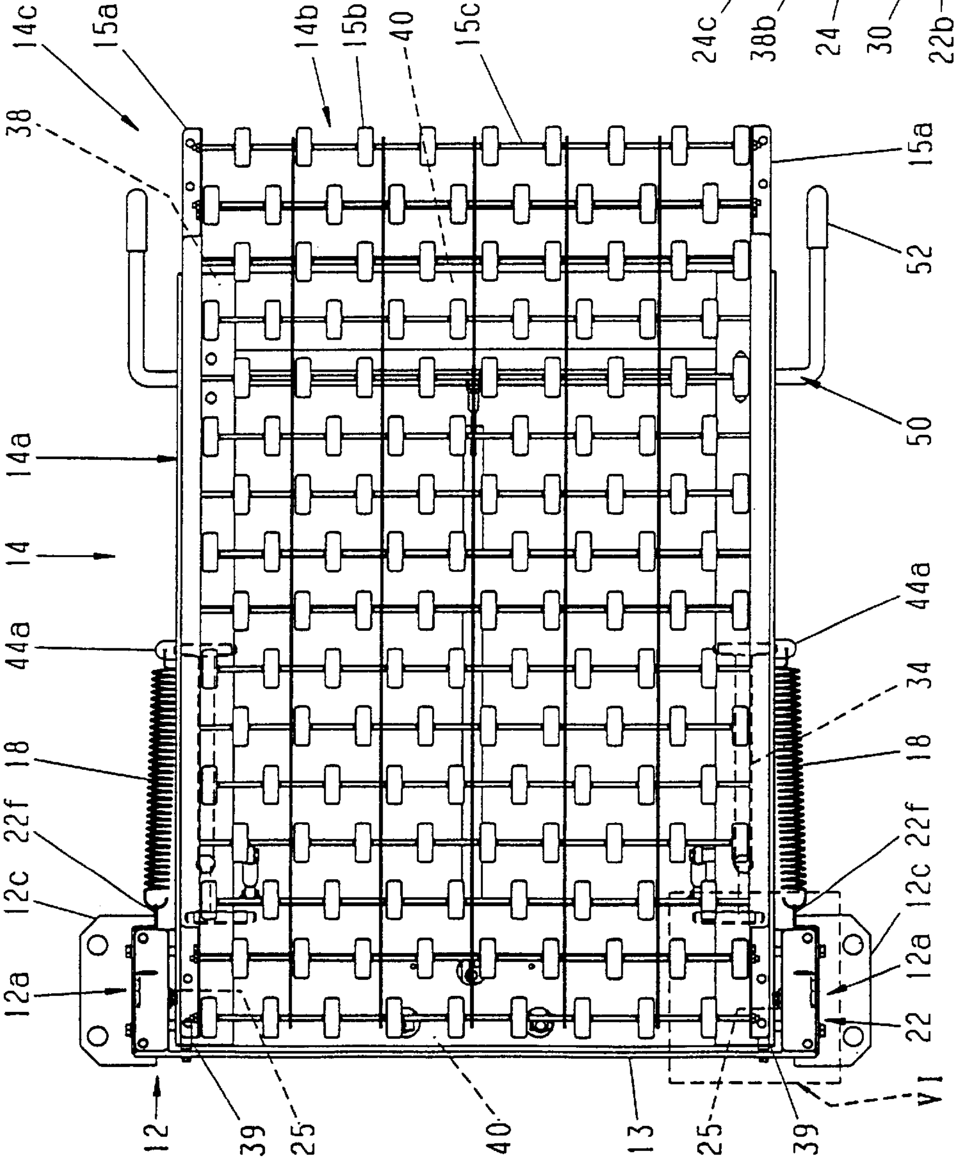
FIG. 5 is a top plan view of the conveyor personnel gate of FIGS. 3 and 4.

Each column 12*a* includes a lower outer portion 20 and an upper inner portion 22, which is slidable within the outer portion 20 to vertically adjust a height of columns 12*a* and thus adapt conveyor gate 10 for various applications with conveyors of different heights. A pair of vertically oriented slots 20*a* may extend along lower portion 20, such that upper portion 22 may be secured in a desired height or location via a pair of fasteners or bolts 20*b* or the like. Cross member 12*b* is secured at a lower end of upper portions 22, such as by welding or the like, and thus is vertically movable with upper portions 22 relative to lower portions 20 of columns 12*a* of support base 12. Columns 12*a* thus may be adjustable between a lowered position, where cross member 12*b* may rest substantially along the floor or ground level (as shown in FIGS. 3–5), and a raised position (as shown in FIGS. 1 and 2), depending on the height of the conveyor at or near which conveyor personnel gate 10 is installed.

Figure 6:
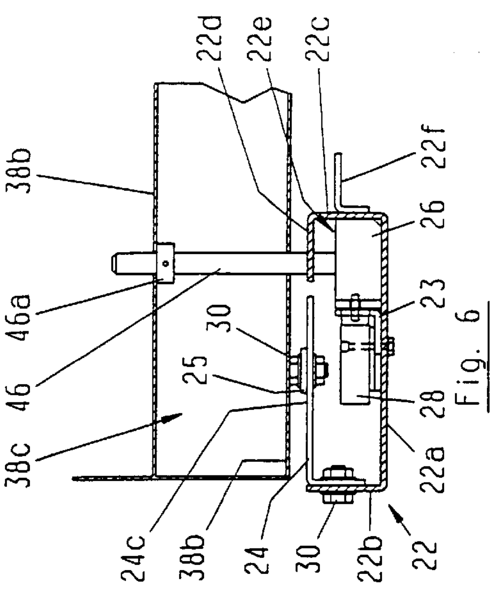
FIG. 6 is an enlarged view of the area VI in FIG. 5, with portions cut away to show additional details of the support column.

As best seen in FIG. 6, upper portion 22 of each column 12*a* is a generally U-shaped plate or bracket and includes an outer plate 22*a* and a pair of opposite side or end plates 22*b* and 22*c*. One end 22*c* further includes an inwardly turned inner portion 22*d* which further defines a U-shaped channel 22*e* for slidably receiving a slide block 26 therewithin, as discussed below. An upper end of inner portion 22*d* defines an upper stop or stepped portion 22g (FIG. 10) to limit upward movement of a pivot axle or pin 46 and slide blocks 26 along channel 22*e*, as discussed below. An inner guide plate or bracket 23 is secured toward an upper end of upper portion 22, for guiding slide block 26 and for mounting a limit switch 28, which is operable to detect when slide block 26 is moved from the upper portion of column 12*a*, as discussed in detail below. Additionally, a spring mounting bracket 22f extends from forward end 22*c* of upper portion 22 for mounting an end of spring 18 thereto, as shown in FIGS. 1–3, 5 and 10.

Figures 7, 8A, 8B, 9A, 9B, 12:
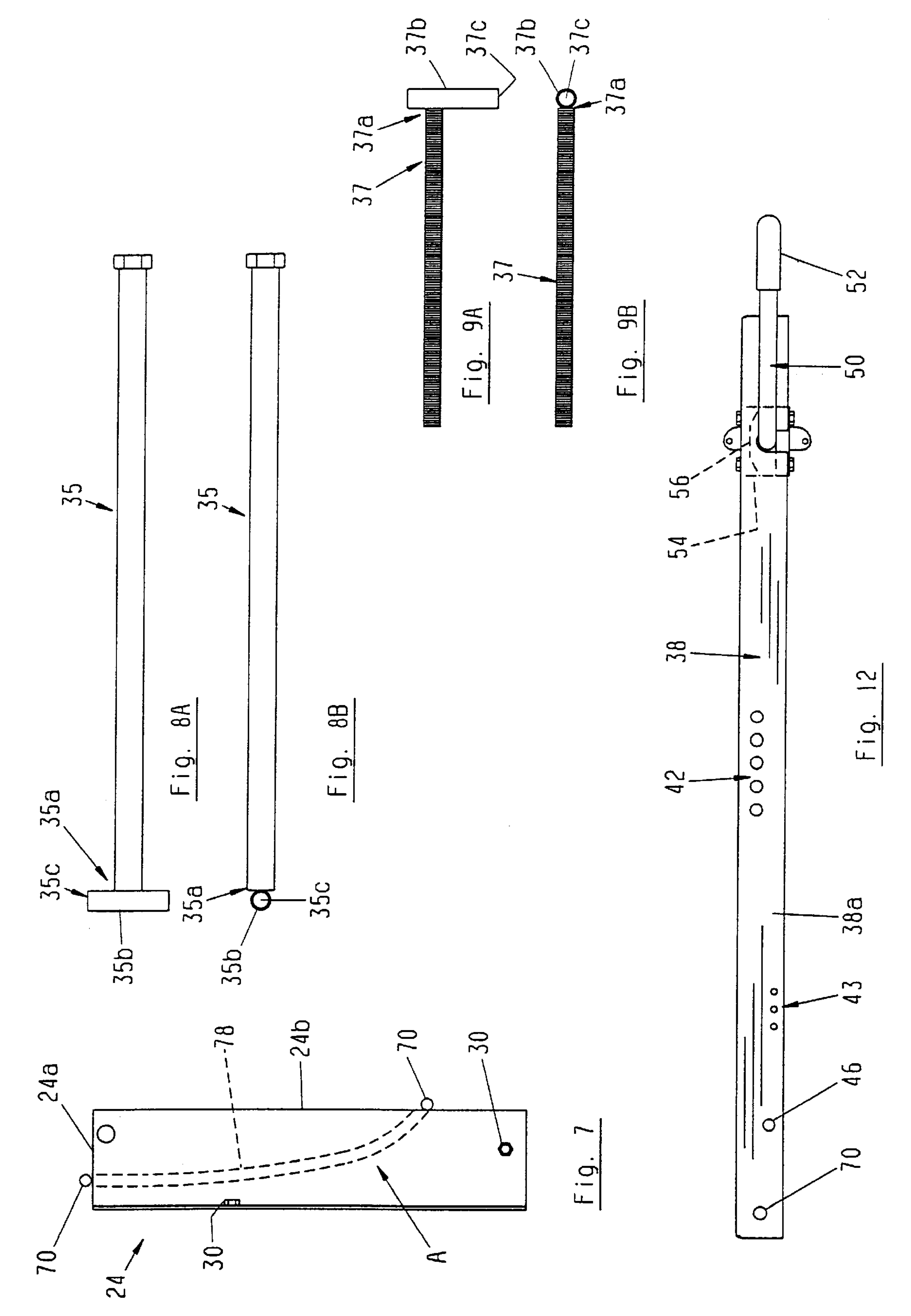
FIG. 7 is a side elevation of a latch plate useful with the present invention.
FIGS. 8A and 8B are side elevations of a tube portion of a strut member useful with the present invention.
FIGS. 9A and 9B are side elevations of a threaded rod portion of the strut member useful with the present invention.
FIG. 12 is a side elevation of the frame and the handle assembly of FIG. 11.

Each column 12*a* further includes a latch plate 24, which is mounted to side portion 22*b* of upper portion 22 and which extends along an inward side of upper portion 22. Latch plate 24 is further secured at a lower end thereof to a mounting bracket 25 (FIGS. 4–6) extending upwardly from cross member 12*b*. Preferably, latch plate 24 is adjustably mounted to upper portion 22 and mounting bracket 25, such as via fasteners 30 or the like. As shown in FIG. 7, latch plate defines an upper stop or latch edge 24*a* and a forward stop or latch edge 24*b*, each of which provides a latching surface for latch mechanism 16, as discussed below.

Cross member 12*b* of support 12 is a generally rectangular beam extending between the lower ends of upper portions 22 of columns 12*a* and includes a pair of brackets 32*a*, 32b positioned toward laterally opposite ends of cross member 12*b*. The brackets 32*a*, 32*b* extend from a forward edge of the cross member and comprise an outer strut mounting bracket 32*a* and an inner strut and damping device mounting bracket 32*b*, which provide a mounting bracket for a strut 34 and a damping device 36, as discussed below. Additionally, an upper cross member of support 13 is welded or otherwise secured to and extends between the upper ends of upper portions 22 to provide additional stability to the columns 12*a* of support 12. An energy absorber 39 (FIG. 3) may be mounted to upper cross member 13 to absorb energy or soften the impact as conveyor portion 14 moves to its fully opened position. Energy absorbers 39 may be cylindrical rubber bumpers bolted or otherwise secured at opposite ends of cross member 13, and are collapsible to absorb the energy upon impact with an upper flange 15*e* of a pair of opposite sidewalls 15*a* of conveying surface 15. Alternately, energy absorber 39 may be any other energy absorbing device, which softens or dampens the opening of conveyor portion 14 relative to support 12, without affecting the scope of the present invention.

Conveyor portion 14 is pivotally and movably mounted to support 12 and includes a frame portion 14*a,* which further supports a conveying surface 14*b* therealong. In the illustrated embodiment, conveying surface 14*b* comprises a gravity skate wheel conveying surface which includes a plurality of rollers or wheels 15*b* rotatably mounted between a pair of sidewalls 15*a* of conveying surface 14*b* via a plurality of rods or axles 15*c*. However, other gravity or powered conveying means may be provided by the conveying surface 14*b,* as discussed below, without affecting the scope of the present invention.

Figure 10:
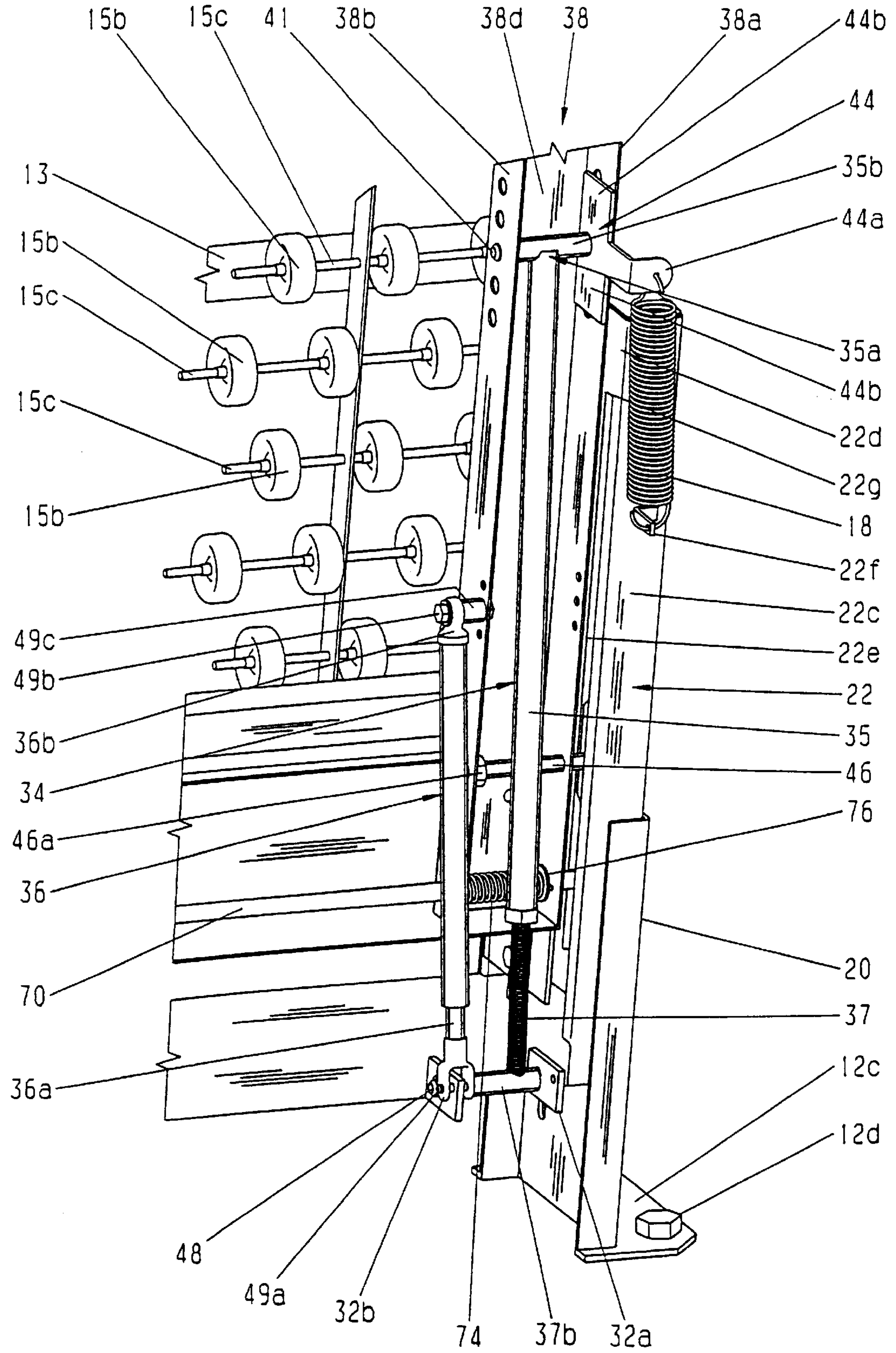
FIG. 10 is a perspective view of a side portion of the conveyor gate in accordance with the present invention, with the gate in its open position.
Figure 11:
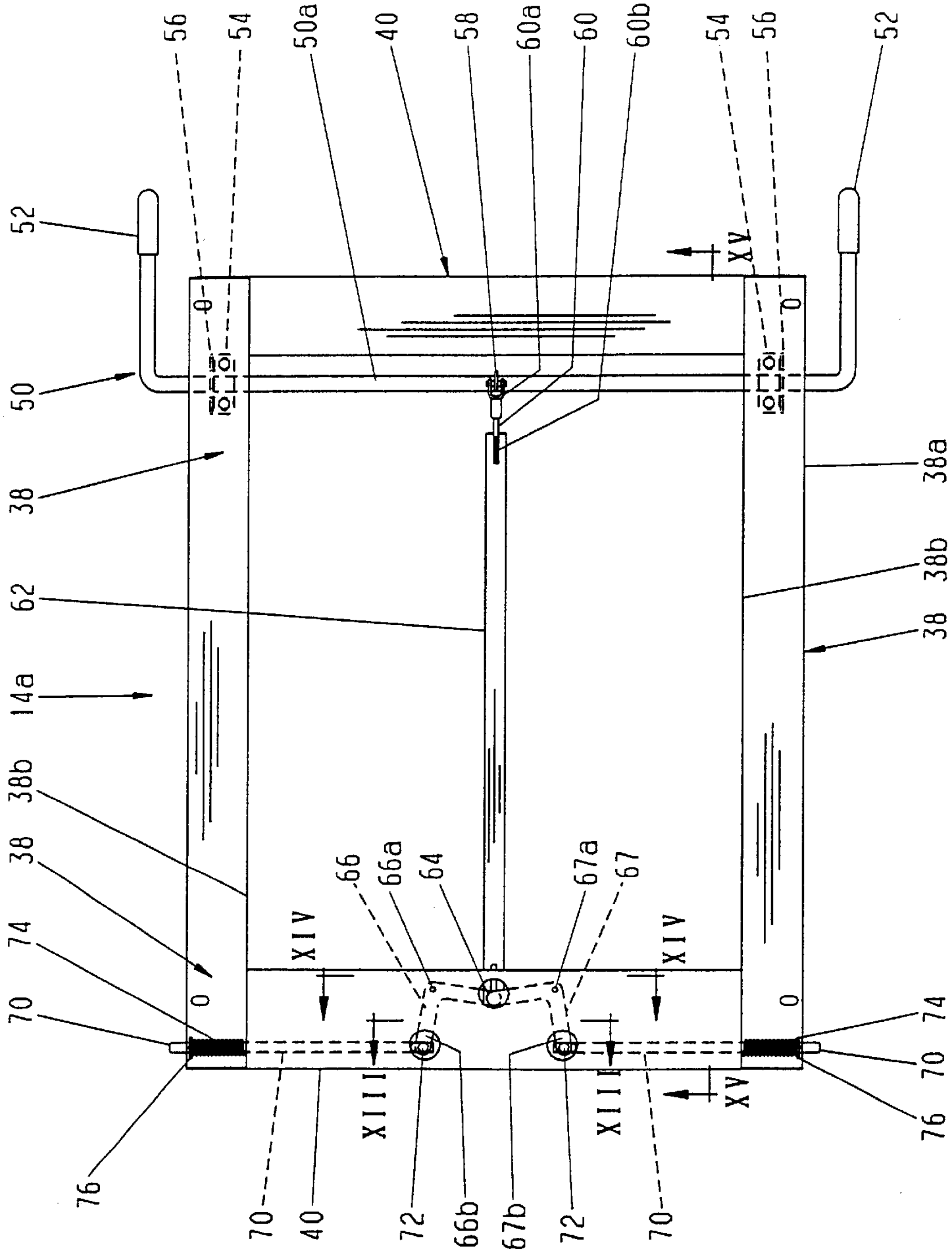
FIG. 11 is a top plan view of the handle and latch mechanism of the present invention as installed on a frame of the conveying portion of the gate of the present invention.

As shown in FIGS. 5, 10 and 11, frame 14*a* includes a pair of opposite sidewalls 38 and at least two generally rectangular beams or cross members 40, which form a generally rectangular platform for mounting the sidewalls 15*a* of conveying surface 14*b* along an upper portion of sidewalls 38. In the illustrated embodiment, and as best seen in FIG. 10, sidewalls 38 are generally U-shaped and include an outer wall 38*a* and an inner wall 38*b*. Sidewalls 38 further include multiple openings or apertures 42 therethrough, which define mounting portions for mounting struts 34 and spring mounts or brackets 44, and apertures 43 which define mounting portions for mounting damping device 36, as discussed below.

Frame 14*a* includes a pivot pin 46 extending laterally through each sidewall 38 and outwardly from each sidewall 38 of frame 14*a* at a location toward support end 14*d* of frame 14*a*. Pivot pins 46 extend outwardly from the sidewalls 38 and into channel 22*e* defined along the inward region of columns 12*a*. Pivot pins 46 extend further into sliding blocks 26, which are slidably positioned within channels 22*e* of columns 12*a*. Preferably, pivot pins 46 are laterally adjustable via a pair of locking collars 46*a,* which determine an amount of lateral extension of the pins 46 from sidewalls 38, and thus may set a lateral position of frame 14*a* with respect to columns 12*a* of support 12. As shown in FIG. 6, locking collars 46*a* may be secured to pins 46 and engage inner sidewall 38*b* of each sidewall 38 such that lateral movement of sidewalls 38 along pins 46 in either direction is substantially precluded by collars 46*a*. As will be described in detail below, sidewalls 38 are pivotable about pivot pins 46 while pins 46 and slide blocks 26 are vertically movable along channels 22*e,* as conveyor portion 14 is raised and lowered between its open and closed positions. Slide blocks 26 are preferably formed of an ultra high molecular weight (UHMW) material which facilitates smooth sliding of blocks 26 within and along channels 22*e*. However, other materials may be implemented without affecting the scope of the present invention.

Conveyor portion 14 is further supported toward its outer end 14*c* by a pair of adjustable struts 34, which pivotably support conveyor portion 14 as it is pivoted about the horizontal axis. Struts 34 extend between strut mounting brackets 32*a,* 32*b* and corresponding mounting openings 42 along sidewalls 38 of frame 14*a*. As best shown in FIGS. 8A, 8B, 9A and 9B, each strut 34 is an adjustable strut, having an outer tube portion 35 and an inner threaded rod 37, which may be rotated relative to one another to adjust an overall length of strut 34. An upper end 35*a* of tube portion 35 of strut 34 is generally T-shaped and includes a mounting portion 35*b* which is welded or otherwise secured to upper end 35*a*. Mounting portion 35*b* defines a generally cylindrical passageway 35*c* for receiving a mounting pin 41 therethrough, as discussed below. Similarly, a lower end 37*a* of rod portion 37 of strut 34 is generally T-shaped and includes a generally cylindrical and hollow tube-shaped mounting portion 37*b* which is welded or otherwise secured to lower end 37*a*. Mounting portion 37*b* also defines a cylindrical passageway 37*c* for receiving a mounting pin 48.

As best shown in FIG. 10, mounting pin 41 extends through one of the openings 42 in outer wall portion 38*a* of sidewall 38 and through spring mounting bracket 44 and further through the upper mounting portion 35*b* of strut 34 until pin 41 extends through inner wall 38*b* of sidewall 38. Pin 41 pivotally retains upper end 35*a* of strut 34 and spring mounting bracket 44 at frame 14*a* of conveyor portion 14, while allowing pivotal movement of strut 34 relative to frame 14*a*. Likewise, lower end 37*a* of strut 34 is pivotally mounted between mounting brackets 32*a,* 32*b* of cross member 12*c* of support 12 via insertion of pin 48 through brackets 32*a,* 32*b* and through mounting portion 37*b*. Therefore, strut 34 is pivotally mounted at cross member 12*b* of support 12, while frame 14*a* of conveyor portion 14 is pivotally mounted at the opposite end of strut 34.

Preferably, struts 34 are adjustable in length to adjust or change the pitch or incline of the conveying surface 14*b* when in the closed position, in order to accommodate different conveyors. This facilitates adjustment of the incline of the conveyor portion 14 to adapt conveyor personnel gate 10 to various applications of gravity or powered conveying surfaces. Preferably, pins 41 and 48 may be quick release pins to ease the disconnection and removal of one or both ends of struts 34 for adjusting the length of the struts and thus the pitch of the conveyor portion 14. Additionally, latch mechanism 16 and latch plate 24 are arranged such that minimal adjustment of the latch plate 24 is necessary irrespective of an incline of the conveyor portion. However, in situations when the incline or pitch is changed significantly, latch plate 24 may be adjusted via adjustment bolts 30, in order to maintain proper functioning of latch mechanism 16, as discussed below.

As also best shown in FIG. 10, each spring mounting bracket 44 is generally T-shaped and is secured to a respective sidewall 38 via a respective mounting pin 41. Opposite arms 44*b* of the T-shaped spring bracket 44 function to engage an upper portion 38*c* of sidewalls 38, and restrict rotational movement of bracket 44 as spring 18 exerts a biasing force at the bracket, as discussed below. Spring mounting brackets 44 extend downward from pins 41 and upper ends 35*a* of struts 34 and are angled laterally outward to define a respective mounting region 44*a* for each spring 18 at a point spaced from and below sidewall 38.

Similar to struts 34, damping devices 36 are pivotally mounted at each end, such that damping device 36 is pivotable relative to mounting bracket 32*b* at cross member 12*b* of support 12 and further pivotable relative to sidewalls 38 of frame 14*a* as conveyor portion 14 is moved between the open and closed position. More particularly, a lower end 36*a* of damping device 36 is mounted to mounting bracket 32*b* via a retaining pin 49*a,* such as a quick release pin or the like, while an upper end 36*b* of damping device 36 is pivotally retained at inner sidewall 38*b* via a suitable fastener, such as a pin or bolt 49*b* and a bushing or spacer 49*c* or the like.

The location of mounting apertures 42 along conveyor portion 14, along with the location of the mounting pins 48 at lower mounting brackets 32*a* and 32*b* for struts 34 are selected such that the conveyor portion 14 is substantially balanced as it moves between its opened and closed positions. The multiple mounting apertures 42 along frame 14*a* provide for further adjustment of strut 34 to accommodate various conveying surface applications or other applications, where the balance of the conveyor portion may change and may thus require a different mounting location of the strut 34. The particular mounting aperture 42 is selected depending on the application of gate 10. Similarly, an appropriate one of the attachment points or openings 43 along frame 14*a* for damper 36 may be selected to optimize the operation of damping device 36.

Figure 14:
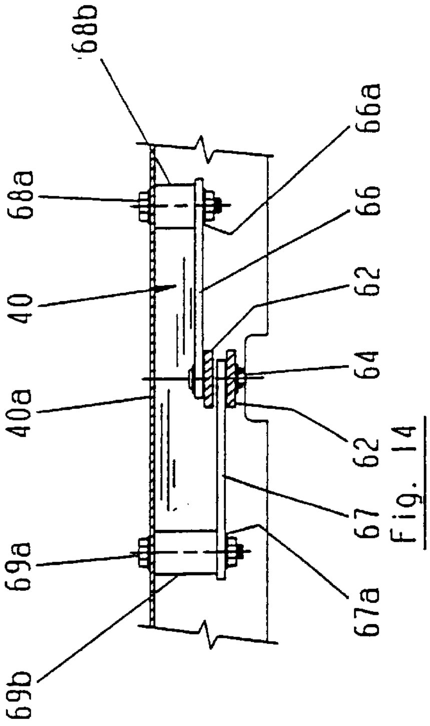
FIG. 14 is a sectional view taken along the line XIV—XIV in FIG. 11.
Figure 15:
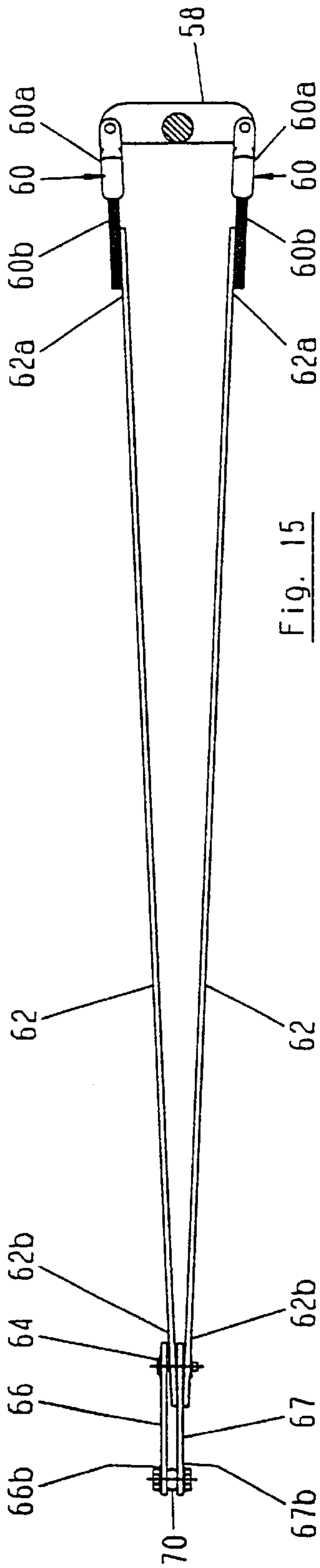
FIG. 15 is a sectional view taken along the line XV—XV in FIG. 11.
Figure 16:
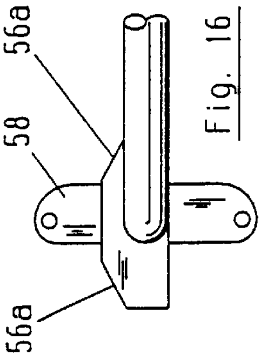
FIG. 16 is a side view of a portion of the handle assembly of the present invention with the handle assembly removed from the frame of the conveyor portion.

Referring now to FIGS. 11–16, latch mechanism 16 of conveyor portion 14 includes a handle member 50, which further includes a pair of grips or grasp handles 52 at opposite ends thereof. Handle member 50 extends across frame 14*a* and is pivotally mounted to sidewalls 38 via a pair of bearing blocks 54, which are bolted or otherwise secured to sidewalls 38 of frame 14*a* of conveyor portion 14. Bearing blocks 54 are preferably formed of an ultra high molecular weight (UHMW) material to facilitate smooth rotation of handle member within blocks 54. However, other materials may be implemented without affecting the scope of the present invention. Grips 52 of handle member 50 may be grasped by a user to rotate handle member 50 to release the latch mechanism and/or to raise or lower conveyor portion 14 of gate 10. As best shown in FIGS. 11 and 16, a pair of tapered plates 56 are welded or otherwise secured along a laterally extending portion 50*a* of handle member 50 at a position laterally outwardly from bearing blocks 54, such that plates 56 limit lateral movement of handle member 50 with respect to frame 14*a*. Tapered plates 56 have tapered or angled edges or surfaces 56*a,* such that the plates and the handle may be rotated until the tapered surfaces 56*a* engage upper portion 38*c* of sidewalls 38 and thus limit further rotation of the handle in that direction.

Lateral portion 50*a* of handle 50 further includes a center plate 58 welded or otherwise secured at a center region of the handle member 50. Center plate 58 extends vertically from lateral portion 50*a* and provides a mounting region for a pair of connectors 60, which connect to an outer end 62*a* of a pair of straps or flexible members 62, such that rotation of lateral portion 50*a* causes one of the straps 62 to be pulled or moved toward handle member 50 via rotation of center plate 58. Connectors 60 may comprise a threaded connection between a female portion 60a pinned to center plate 58 and a male portion 60*b* secured to outer end 62*a* of straps 62 (FIGS. 11 and 15), or may be other suitable means for connecting the straps 62 to the center plate 58, without affecting the scope of the present invention. Straps 62 are preferably flexible, such that as one strap is pulled by rotation of handle 50, the other strap may flex when there is slack and thus does not exert a pushing force in the opposite direction of the pulling force exerted by the other strap.

As best shown in FIGS. 11 and 15, straps 62 extend from connectors 60 and lateral portion 50*a* of handle 50 to a connecting pin 64, which connects the opposite ends 62*b* of straps 62 to a pair of angled pivot members 66 and 67. Each pivot member 66 and 67 is pinned at a generally center location 66*a,* 67*a* to an upper plate 40*a* of cross member 40 at support end 14*d* of frame 14*a,* as best shown in FIG. 14. Pivot members 66 and 67 may be mounted to cross member 40 via different length bolts 68*a,* 69*a* and spacers 68*b,* 69*b,* to account for variation in the mounting height of the pivot members 66, 67, due to their being mounted on top of one another at pin 64.

Figure 13:
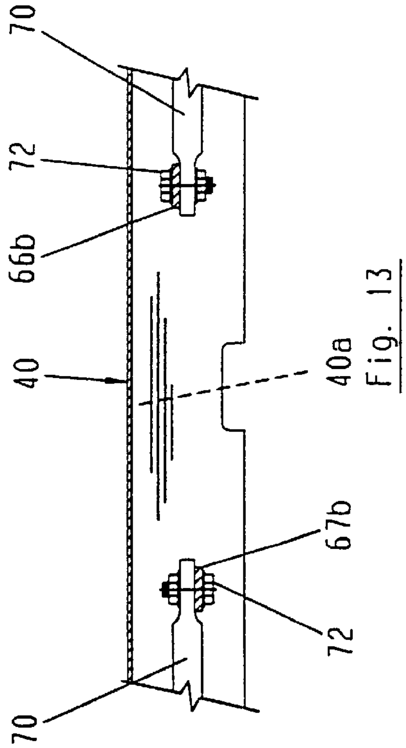
FIG. 13 is a sectional view taken along the line XIII—XIII in FIG. 11.

An opposite end 66*b,* 67*b* of each pivot member 66, 67 from the pivot pin 64 is connected to a respective one of a pair of opposite latch pins or rods 70 via pivot pins 72, as best shown in FIGS. 11 and 13. Latch rods 70 extend laterally outwardly from pivot members 66, 67 and protrude through sidewalls 38 of frame 14*a* and extend outwardly therefrom. As best shown in FIGS. 10 and 11, a spring or biasing member 74 is positioned along each latch rod 70 between inner sidewall 38*b* and a collar or ring 76 secured toward an outer end of latch rod 70.

Spring 74 thus exerts a biasing force laterally outwardly from inner sidewall 38*b* to bias the latch rods 70 toward their outward or engaged position, such that upon release of grasp handle 52, the latch rods 70 will return toward their biased engaged position, and handle member 50 will rotate back to its initial position as well, as discussed below.

Accordingly, rotation of handle member 50 in either direction pulls at one of the straps 62 and thus provides a pulling force at the pin 64 connecting the straps 62 to the pivot members 66 and 67. As the pulling force is exerted at pin 64, pivot members 66 and 67 both pivot about their pivot pins 68*a,* 69*a,* respectively, such that the opposite ends 66*b,* 67*b* of pivot members 66, 67 are moved laterally inwardly and toward one another, thereby pulling at latch pins or rods 70 and thus overcoming the biasing force of springs 74 to move latch rods 70 laterally inward.

With reference to FIGS. 7 and 11, when handle grip 52 is released, springs 74 move latch rods 70 outwardly to an engaged position, whereby the latch pins engage upper edges 24*a* of latch plates 24 when conveyor portion 14 is closed, or engage forward edges 24*b* of latch plates 24 when conveyor portion 14 is opened, or push outwardly against an inner surface 24*c* of latch plate 24 as the conveyor portion 14 is moved between the opened and closed positions. More particularly, when conveyor portion 14 is in its closed position, latch rods 70 extend outwardly over upper edges 24*a* of latch plates 24, and thus restrict downward movement of latch rods 70, which further substantially precludes upward movement of outer end 14*c* of conveyor portion 14 toward its opened position. When grip 52 is lifted upwardly, this causes rotation of lateral portion 50*a* of handle member 50 and thus causes one of the straps 62 to pull at the pivot members 66, 67 to further pull latch rods 70 laterally inwardly until the are spaced inwardly or are removed from the upper edges 24*a* of latch plates 24. Further lifting of grip 52 results in conveyor portion 14 being raised towards its opened position, whereby slide blocks 26 slide vertically downwardly along channels 22*e,* while latch rods 70 moves along a generally arcuate path 78 (FIG. 7) along inner surface 24*c* of the respective latch plates 24.

As the conveyor portion 14 is raised upward from its closed position, slide blocks 26 slide vertically downward along columns 12*a,* while struts 34 pivot about pins 48, such that the support end 14*d* of conveyor portion 14 is dropped generally vertically downward along and between columns 12*a* of support 12, while conveyor portion 14 is further pivoted upwardly about pivot pins 46 at slide blocks 26. Slide blocks 26 continue to move down along columns 12*a,* while struts 34 pivot about pins 48 and conveyor portion 14 pivots about pins 41, until conveyor portion 14 is positioned generally vertically in its opened position, as shown in FIG. 2. Pivot pins 46 thus provide a movable horizontal pivot axis, such that the conveyor portion 14 pivots about the axis or pins 46 while moving downwardly along and between columns 12*a* of support 12. Outer end 14*c* of conveyor portion 14 is thus lower in its opened position than it would be if it were pivoted about a stationary axis at the support.

When conveyor portion 14 reaches its generally vertical, open position, latch rods 70 move past forward edge 24*b* of latch plate 24 and again extend laterally outwardly in response to springs 74, such that the rods engage the forward edge 24*b* and substantially preclude movement of latch rods 70 in the opposite direction, thereby automatically latching the gate in its open position. As latch rods 70 move laterally outwardly in response to spring 76, handle member 50 is pivoted back to its initial position with respect to conveyor portion 14. Also, as conveyor portion 14 is pivoted toward the generally vertical, opened position, energy absorbers 39 engage upper flanges 15*e* of sidewalls 15*a,* to dampen and absorb the energy at impact of the conveyor portion 14 with support 12 as conveyor portion 14 reaches its fully opened position. Movement of grasp handles 52 in the opposite direction reverses the process to return the conveyor portion 14 to its generally horizontal closed position. As pivot pins 46 and slide blocks 26 approach the upper end of columns 12*a,* pivot pins 46 engage upper stops 22*g* of inner portions 22*d* of upper portions 22, which substantially precludes further upward movement of pins 46. The conveyor portion 14 is thus positioned at its fully closed position. Preferably, latch plates 24 are adjusted such that latch rods 70 engage upper edges 24*a* of latch plates 24 as pivot pins 46 engage stops 22*g,* in order to substantially secure the conveyor portion 14 in its fully closed position.

Because the conveyor portion 14 is substantially balanced via the arrangement of struts 34 and support 12, and because springs 18 are mounted in an over center manner, springs 18 function to bias and move conveyor portion 14 toward either its closed position or its opened position with little or no manual intervention once the conveyor portion 14 is positioned at least partially toward the opened or closed position, respectively. More particularly, as conveyor portion 14 is raised from its closed position, the user or operator raising the conveyor portion must overcome the biasing force of springs 18 and stretch springs 18 to a stretched position (not shown). In the illustrated embodiment, the handle force to open the gate and to begin raising the gate towards its opened position is less than fifteen pounds through 95 percent of the travel of conveyor portion 14. As the conveyor portion 14 is pivoted further, springs 18 are stretched to a maximum length at a particular location or neutral position of the conveyor portion 14 relative to support 12. The lifting force progressively approaches zero as the gate reaches the neutral position. In the illustrated embodiment, this neutral position is at approximately three-quarters of the way toward the opened position of the gate or when the latch rods 70 are approximately at location A along arcuate path 78 at latch plate 24 (FIG. 7). Once conveyor portion 14 is moved past the neutral or balanced position toward the open position, springs 18 function to self propel or automatically continue to move the conveyor portion 14 to its fully opened position, whereby springs 18 are in a generally vertical position, as shown in FIGS. 2 and 10. At that point, slide blocks 26 are moved to their lowest position along columns 12*a,* while latch pins 70 engage forward edges 24*b* of latch plates 24, to retain conveyor portion 14 in its generally vertical and upright, open position.

Similarly, when conveyor portion 14 is moved from its opened position toward its closed position, springs 18 are again stretched as slide blocks 26 move upwardly along channels 22*e,* while struts 34 pivot outwardly away from support 12. At the particular position or neutral position, such as approximately one quarter of the way towards the closed position, springs 18 reaches their fully stretched lengths, whereby further movement of conveyor portion 14 past the neutral position results in springs 18 self propelling or automatically moving conveyor portion 14 downward towards it closed position, as shown in FIGS. 1 and 3. As springs 18 pull conveyor portion 14 downward, damping devices 36 slow down, dampen or control the closing of the gate to substantially preclude excessive speed of the gate in a downward direction and/or slamming of the conveyor portion into its closed position.

Because each spring 18 is connected to mounting bracket 44 at a point spaced from or below the pivot axis or pin 41 of the conveyor portion 14 relative to the respective strut 34, each of the springs 18 exerts a biasing force in a generally horizontal direction to create a moment arm on spring mounting bracket 44 to pivot bracket 44 and thus conveyor portion 14 about the respective pin 41 in a generally clockwise direction as shown in FIG. 3. As springs 18 pull at brackets 44, conveyor portion 14 rotates about pivot pins 41 to raise the support end 14*d* of conveyor portion 14 and thus the latch rods 70, thereby ensuring that latch rods 70 move upward above the upper edges 24*a* of latch plates 24, to securely retain the conveyor portion 14 in its closed position. Springs 18 thus function to pivot conveyor portion 14 about pins 41 until pivot pins 26 engage upper stops 22*g* of columns 12*a,* whereby the conveyor portion 14 is at its lowered, fully closed position.

Optionally, and preferably, limit switch 28 is included at an upper end of support 12 and is operable to deactivate the conveyor once it detects that conveyor portion 14 of gate 10 is not fully in its closed position. In the illustrated embodiment, limit switch 28 is an electronic plunger switch, which includes a plunger 28*a* which contacts slide block 26 when slide block 26 is in its upward position and conveyor portion 14 is thus in its closed position. When conveyor portion 14 is first raised or moved from its closed position, pivot pin 46 and slide block 26 move downwardly along channel 22*e* of column 12*a.* Once slide block 26 moves downward along columns 12*a,* the plunger detects that the block is no longer in its upward position, and limit switch 28 is then operable to deactivate the conveyor system. More particularly, limit switch 28 detects the downward movement of slide block 26 and opens a circuit or otherwise communicates a signal to a control system (not shown) of the conveyor system to deactivate the conveyor system. Limit switch 28 thus functions to deactivate at least the upstream portion of the conveyor system at which the gate 10 is installed, to prevent further articles or packages from being moved therealong into or onto conveyor portion 14 of gate 10 when the conveyor portion 14 is not in its fully closed position. Because upward movement of pins 46, and thus slide blocks 26, is limited by stops 22*g,* slide blocks 26 are consistently in substantially the same location relative to support 12 each time the gate is closed, regardless of pitch changes or the like to the conveyor portion. Accordingly, limit switch 28 is operable to detect movement of slide blocks 26 from a generally consistent uppermost position of the blocks, and thus does not require adjustment even if the pitch of the conveying surface is adjusted.

Figure 17:
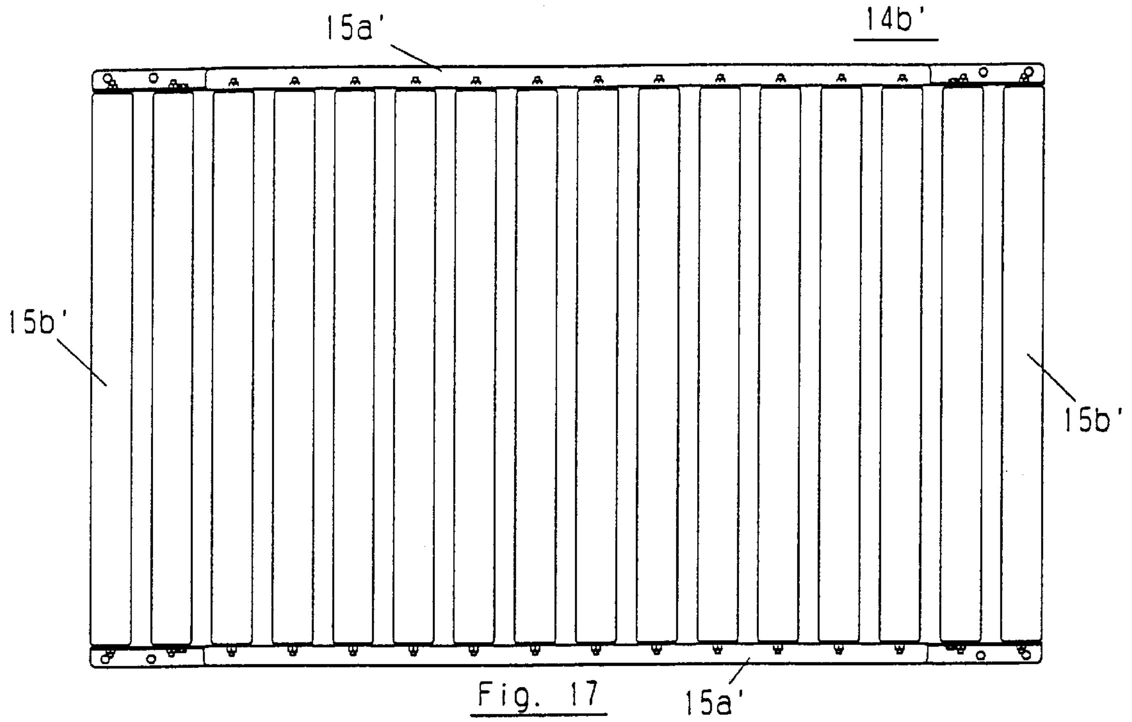
FIG. 17 is a top plan view of a gravity roller conveying surface useful with the present invention.
Figure 18:
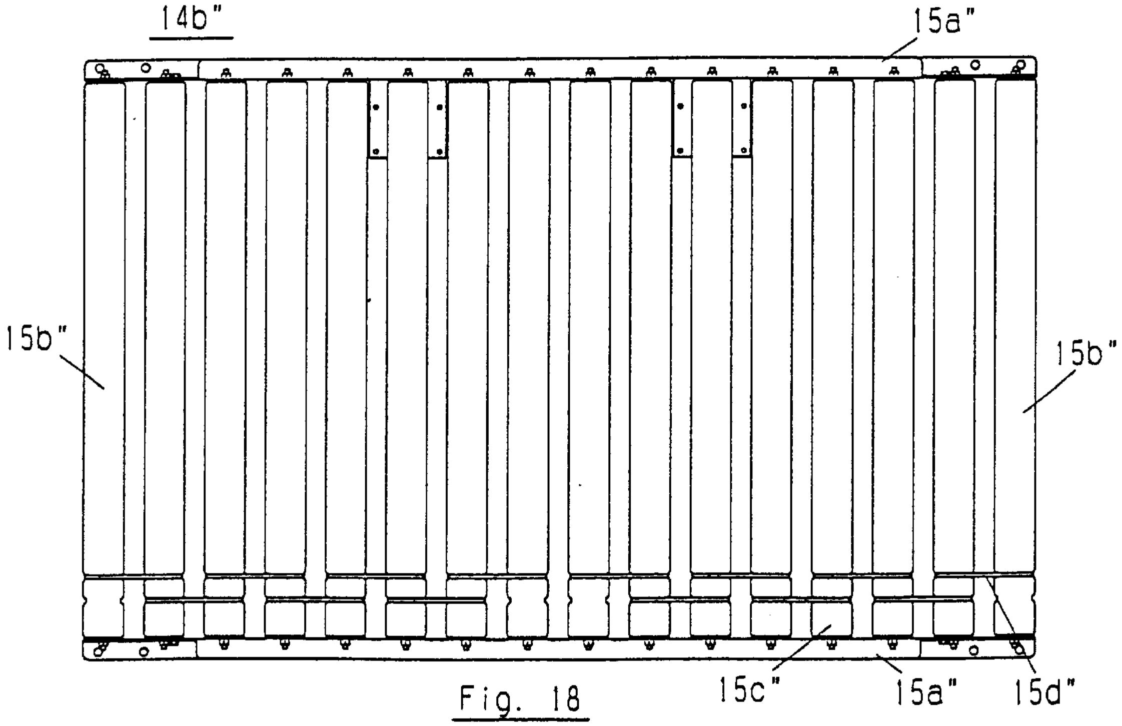
FIG. 18 is a top plan view of a powered roller conveying surface useful with the present invention.
Figure 19:
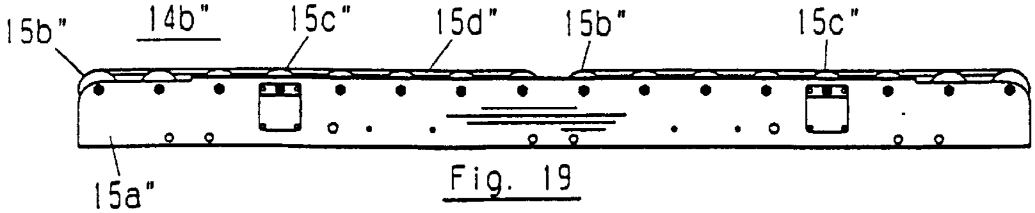
FIG. 19 is a side elevation of the powered roller conveying surface of FIG. 18.

Although shown and described as providing a gravity skate wheel conveying surface, conveying surface 14*b* may comprise other gravity conveying surfaces or powered conveying surfaces. For example, a conveying surface 14*b*' (FIG. 17) may comprise a gravity roller conveying surface, which includes a plurality of rollers 15*b*' rotatably supported along sidewalls 15*a*' of conveying surface 14*b*'. Alternately, a conveying surface 14*b*" (FIGS. 18 and 19) may comprise a powered roller conveying surface. The conveying surface 14*b*" includes a plurality of freely rotating rollers 15*b*" and at least one powered roller 15*c*" supported along sidewalls 15*a*" of conveying surface 14*b*'. The powered roller or rollers 15*c*" are connected to the driven or free rollers 15*b*" by belts or bands 15*d*", to drive the driven rollers 15*b*" via rotation of powered roller 15*c*", as is known in the conveying arts. Clearly, other forms of conveying surfaces, such as a belt conveying surface, a roller ball conveying surface or the like, may alternately be implemented with the conveyor personnel gate of the present invention, without affecting the scope of the present invention. Additionally, it is further envisioned that the conveying surface of the personnel gate may comprise two or more conveyors, such as a belt conveyor with a gravity roller conveyor along one or both sides of the belt conveyor, or other combinations of conveying surfaces, in order to accommodate multiple side by side conveyors or the like.

Accordingly, the present invention provides a conveyor personnel gate which is applicable to a variety of conveyor systems. The gate of the present invention is a freestanding gate, and may be sized to fit within standard gaps between the upstream and downstream conveying surfaces. Optionally, the gate may be stabilized or secured to the conveyor at the support section of the gate to further stabilize the gate if desired. The conveyor portion may support a gravity operated conveying surface, such as a roller conveying surface, a skate wheel conveying surface, a roller ball conveying surface and/or the like, or a powered conveying surface, such as a powered roller conveying surface, a powered belt conveying surface and/or the like. The support of the present invention defines a guide and a strut, with the conveyor portion being movable along the guide of the support and pivotable about the strut. The strut pivots about one end portion of the strut at the support while the conveyor portion pivots about an opposite end portion of the strut. Preferably, the strut is adjustable to adjust a pitch or incline of the conveyor surface to match the pitch or incline and height of the upstream and downstream conveying surfaces of the conveying system at which the gate is implemented. The pitch may be adjustable in either direction to raise or lower the outer end of the conveyor portion with respect to horizontal and may be quickly and easily adjusted by removing the quick release pins at one or both ends of the struts and turning the support struts in or out to achieve the desired pitch, thereby quickly adapting the gate to various applications. The gate is thus completely independent of the style or type of upstream and downstream conveying surfaces at which the gate is implemented.

The conveyor personnel gate of the present invention also includes a latch assembly which functions to latch and thus secure the conveyor portion of the gate at each of the opened and closed positions. The latch assembly is operable via rotation in either direction of a handle member which extends from and partially along each side of the conveyor portion. Accordingly, raising a grasp handle at the handle portion when the conveyor is in its closed position not only disengages the latch mechanism, but also allows the operator to raise the conveyor from its closed position toward its opened position. Likewise, pulling at the grasp handle when the gate is latched in its opened position results in the handle rotating to disengage the latch mechanism and further allows the user to pull the conveyor portion downward toward the closed position.

The present invention also includes a biasing member which is operable to self propel or automatically move or bias the conveyor portion from a neutral position or particular position toward either the opened position or closed position as the conveyor portion is moved past the neutral position toward the opened or closed position, respectively. The gate of the present invention is thus easily movable by an operator between the opened and closed positions via the biasing forces of the biasing member or spring. Additionally, a damping device may be included to slow or control downward movement of the conveyor portion toward the closed position, in order to prevent rapid closure of the gate. This not only reduces the possibility of injury to a person passing through the gate, but also reduces the possibility of damage to the components which may otherwise occur if the gate is allowed to slam to its closed position.

The conveyor personnel gate of the present invention also provides a moving pivot point which slides down into the base or support structure as the gate is opened. This provides a lower height to the conveyor gate in its opened position, in order to clear low overhead conveyors such as trash conveyors over pick lines or the like. Also, because the conveyor portion is lowered relative to the support when it is moved to its opened position, the latch mechanism handles are then provided at a convenient ergonomic height for an operator to easily grasp and move the handles when the gate is in its opened position.

Therefore, the present invention provides a conveyor personnel gate which is movable between an opened and closed position in a controlled manner. The gate includes a latch that is operable to latch the conveyor in the closed position and is further operable to latch the conveyor portion of the gate in an opened position, in order to substantially preclude the conveyor from closing unexpectedly. The conveyor personnel gate of the present invention is operable in a controlled manner, and is self-propelled toward the closed position and/or the open position in response to the conveyor portion being moved to a point past a particular position toward either the open or closed position. The conveyor personnel gate further includes a damping device, which controls downward movement of the gate toward the closed position, in order to substantially preclude slamming of the gate toward the closed position. Additionally, the incline of the conveyor portion of the gate of the present invention may be adjusted for various applications of the gate, such that the gate may be applicable to various conveying surfaces. The gate is a free standing device, and does not require mounting of the gate to the upstream end of the conveyor and further mounting of a saddle or receiving bracket at the downstream end of the conveyor to receive the gate when in its closed position. This provides improved installation of the gate of the present invention and facilitates implementation of the gate at various conveying systems.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A conveyor personnel gate comprising:

a support;

a conveyor portion pivotally supported by said support to pivot about a generally horizontal axis, said conveyor portion being pivotable between an open position and a closed position; and a latch which is operable to latch said conveyor portion relative to said support in said open position, said conveyor portion being positively secured in said open position with at least one latch member engaging a surface when said latch latches said conveyor portion in said open position, said latch being operable to unlatch said conveyor portion by disengaging said at least one latch member from said surface to allow said conveyor portion to move toward said closed position.

2. The conveyor personnel gate of claim 1, wherein said latch is operable to latch said conveyor portion to said support in said open and closed positions.

3. The conveyor personnel gate of claim 1 including a user handle, said latch being operable in response to movement of said user handle.

4. The conveyor personnel gate of claim 3, wherein the conveyor portion is movable between said open and closed positions via movement of said user handle by a user.

5. The conveyor personnel gate of claim 1, wherein said conveyor portion includes a frame pivotally supporting a conveying surface of said conveyor portion with respect to said support.

6. The conveyor personnel gate of claim 1, wherein said conveyor portion is self-propelled to said open position from a particular position between said open position and said closed position.

7. The conveyor personnel gate of claim 6, wherein said conveyor portion is self-propelled in response to a biasing member interconnected between said support and said conveyor portion.

8. The conveyor personnel gate of claim 6, wherein said particular position is approximately one quarter of the travel of said conveyor portion from said open position to said closed position.

9. The conveyor personnel gate of claim 6, wherein said conveyor is self-propelled to said closed position from a position beyond said particular position toward said closed position.

10. The conveyor personnel gate of claim 9, wherein said conveyor portion is self-propelled in response to at least one biasing member interconnected between said support and said conveyor portion.

11. The conveyor personnel gate of claim 10, wherein said biasing member is operable to bias said conveyor portion toward said closed position when said conveyor portion is positioned between said particular position and said closed position and is further operable to bias said conveyor portion toward said open position when said conveyor portion is positioned between said particular position and said open position.

12. The conveyor personnel gate of claim 11, wherein said conveyor is self-propelled in a controlled movement to said closed position.

13. The conveyor personnel gate of claim 12 further including a damping device which is operable to control movement of said conveyor portion toward said closed position.

14. The conveyor personnel gate of claim 1, wherein said conveyor portion is supported in a cantilevered manner from said support when positioned at least partially toward said closed position.

15. The conveyor personnel gate of claim 1, wherein said conveyor portion is movably and pivotably supported by said support and pivotably supported by a strut interconnected between said support and said conveyor portion.

16. The conveyor personnel gate of claim 15, wherein said strut is adjustable to adjust a pitch of said conveyor portion relative to said support.

17. The conveyor personnel gate of claim 1, wherein said conveyor portion is movable at least partially within said support when said conveyor portion is moved to said open position, said conveyor portion being generally vertical in said open position and partially within said support.

18. The conveyor personnel gate of claim 1, wherein said conveyor portion supports a gravity operated conveying surface.

19. The conveyor personnel gate of claim 18, wherein said conveying surface is one of a roller conveying surface, a skate wheel conveying surface and a roller ball conveying surface.

20. The conveyor personnel gate of claim 1, wherein said conveyor portion supports a powered conveying surface.

21. The conveyor personnel gate of claim 20, wherein said conveying surface is one of a power roller conveying surface and a powered belt conveying surface.

22. A conveyor personnel gate comprising:

a support;

a conveyor portion pivotally supported by said support to pivot about a generally horizontal axis; and a latch which is operable to latch said conveyor portion relative to said support in both an open position and a closed position, wherein said conveyor portion is adjustable relative to said support to adjust a pitch of said conveyor portion relative to said support.

23. The conveyor personnel gate of claim 22, wherein said the pitch is adjustable upwardly and downwardly with respect to horizontal.

24. The conveyor personnel gate of claim 23, wherein said conveyor portion is pivotably supported by an adjustable elongated member, a length of said elongated member being adjustable to adjust the pitch of said conveyor portion.

25. A conveyor personnel gate, comprising:

a support;

a conveyor portion pivotally supported by said support to pivot about a generally horizontal axis, said conveyor portion being movable between an open position and a closed position; and a handle-operated latch assembly including a grasp handle at said conveyor portion and a latch, said grasp handle being movable relative to said support to move said conveyor portion about said axis, said latch being operable to latch said conveyor portion in at least one of said closed position and said open position, said latch being unlatched in response to movement of said grasp handle relative to said conveyor portion in at least one of a first direction generally toward said open position and a second direction generally toward said closed position.

26. The conveyor personnel gate of claim 25, wherein said latch is operable to latch said conveyor portion in said closed position and is further operable to latch said conveyor portion in said open position.

27. The conveyor personnel gate of claim 25, wherein movement of said grasp handle in said first direction when said conveyor portion is in a closed position unlatches said latch and moves said conveyor portion toward said open position.

28. The conveyor personnel gate of claim 27, wherein movement of said grasp handle in said second direction when said conveyor portion is in said open position unlatches said latch and moves said conveyor portion toward said closed position, said first direction being generally opposite said second direction.

29. The conveyor personnel gate of claim 25, wherein said conveyor portion is pivotable between an open and closed position.

30. The conveyor personnel gate of claim 29, wherein said conveyor portion is self-propelled to said open position from a particular position between said open position and said closed position.

31. The conveyor personnel gate of claim 30, wherein said conveyor is self-propelled to said closed position from a position beyond said particular position toward said closed position.

32. The conveyor personnel gate of claim 31, wherein said conveyor portion is self-propelled in response to at least one biasing member interconnected between said support and said conveyor portion.

33. The conveyor personnel gate of claim 32, wherein said biasing member is operable to bias said conveyor portion toward said closed position when said conveyor portion is positioned between said particular position and said closed position and is further operable to bias said conveyor portion toward said open position when said conveyor portion is positioned between said particular position and said open position.

34. The conveyor personnel gate of claim 33, wherein said conveyor is self-propelled in a controlled movement to said closed position.

35. The conveyor personnel gate of claim 25, wherein said conveyor portion is pivotably supported by a strut interconnected between said support and said conveyor portion, said strut being pivotable relative to said support, said conveyor portion being pivotable relative to said strut and pivotable and movable relative to said support.

36. The conveyor personnel gate of claim 25, wherein said conveyor portion supports a gravity operated conveying surface.

37. The conveyor personnel gate of claim 36, wherein said conveying surface is one of a roller conveying surface, a skate wheel conveying surface and a roller ball conveying surface.

38. The conveyor personnel gate of claim 25, wherein said conveyor portion supports a powered conveying surface.

39. The conveyor personnel gate of claim 38, wherein said conveying surface is one of a power roller conveying surface and a powered belt conveying surface.

40. A conveyor personnel gate, comprising:

a support;

a conveyor portion pivotally supported by said support to pivot about a generally horizontal axis, said generally horizontal axis being movable relative to said support as said conveyor portion pivots between a generally horizontal closed position and an open position; and a biasing member which is operable to control movement of said conveyor portion about said axis between said generally horizontal closed position and said open position, said biasing member being interconnected between said support and said conveyor portion such that said biasing member biases said conveyor portion toward said closed position when said conveyor portion is positioned between a neutral position and said closed position, said biasing member biasing said conveyor portion toward said open position when said conveyor portion is positioned between said neutral position and said open position, said neutral position being located in a plane between a horizontal plane and a vertical plane.

41. The conveyor personnel gate of claim 40, wherein said biasing member is interconnected between said support and said conveyor portion via an over-center mount arrangement.

42. The conveyor personnel gate of claim 40 further including a damping device which is operable to control movement of said conveyor portion toward said closed position.

43. The conveyor personnel gate of claim 40, wherein said support includes a guide and a strut, said conveyor portion being movable along said guide and pivotable about said strut.

44. The conveyor personnel gate of claim 40, wherein said biasing member is interconnected between said support and said conveyor portion in a generally horizontal orientation when said conveyor portion is in said closed position.

45. The conveyor personnel gate of claim 44, wherein said biasing member is interconnected between said support and said conveyor portion in a generally vertical orientation when said conveyor portion is in said open position.

46. The conveyor personnel gate of claim 40, wherein said conveyor portion supports a gravity operated conveying surface.

47. The conveyor personnel gate of claim 46, wherein said conveying surface is one of a roller conveying surface, a skate wheel conveying surface and a roller ball conveying surface.

48. The conveyor personnel gate of claim 40, wherein said conveyor portion supports a powered conveying surface.

49. The conveyor personnel gate of claim 48, wherein said conveying surface is one of a power roller conveying surface and a powered belt conveying surface.

50. A conveyor personnel gate comprising:

a support;

a conveyor portion pivotally supported by said support to pivot about a generally horizontal axis; and a biasing member which is operable to control movement of said conveyor portion about said axis between a generally horizontal closed position and an open position, said biasing member being interconnected between said support and said conveyor portion such that said biasing member biases said conveyor portion toward said closed position when said conveyor portion is positioned between a neutral position and said closed position, said biasing member biasing said conveyor portion toward said open position when said conveyor portion is positioned between said neutral position and said open position, said support including a guide and a strut, said conveyor portion being movable along said guide and pivotable about said strut, wherein said generally horizontal axis is at a support end of said conveyor portion and is movable along said guide in a generally vertical direction as said conveyor portion is moved between said open and closed positions.

51. The conveyor personnel gate of claim 50, wherein said conveyor portion is generally vertical and said axis is at a lower position along said guide when said conveyor portion is in said closed position.

52. A conveyor personnel gate comprising:

a support;

a conveyor portion pivotally supported by said support to pivot about a generally horizontal axis; and a biasing member which is operable to control movement of said conveyor portion about said axis between a generally horizontal closed position and an open position, said biasing member being interconnected between said support and said conveyor portion such that said biasing member biases said conveyor portion toward said closed position when said conveyor portion is positioned between a neutral position and said closed position, said biasing member biasing said conveyor portion toward said open position when said conveyor portion is positioned between said neutral position and said open position, said support including a guide and a strut, said conveyor portion being movable along said guide and pivotable about said strut, wherein said strut is adjustable to adjust a pitch of said conveyor portion.

53. The conveyor personnel gate of claim 52, wherein a length of said strut is adjustable to adjust the pitch upwardly and downwardly from horizontal.

54. A conveyor personnel gate comprising:

a support;

a conveyor portion pivotally supported by said support to pivot about a generally horizontal axis; and a biasing member which is operable to control movement of said conveyor portion about said axis between a generally horizontal closed position and an open position, said biasing member being interconnected between said support and said conveyor portion such that said biasing member biases said conveyor portion toward said closed position when said conveyor portion is positioned between a neutral position and said closed position, said biasing member biasing said conveyor portion toward said open position when said conveyor portion is positioned between said neutral position and said open position, said support including a guide and a strut, said conveyor portion being movable along said guide and pivotable about said strut, wherein said strut pivots about one end portion of said strut at said guide while said conveyor portion pivots about an opposite end portion of said strut as said conveyor portion is moved between said open and closed positions.

55. The conveyor personnel gate of claim 54, wherein said biasing member is connected to said conveyor portion at a mount which is spaced from said opposite end portion of said strut.

56. The conveyor personnel gate of claim 55, wherein said biasing member is operable to pivot said conveyor portion about said opposite end portion of said strut as said conveyor portion approaches said closed position to latch said conveyor portion in said closed position.

* * * * *